July 21, 1959
IWAO ONO
2,895,535
PROCESSES AND APPARATUSES FOR PRODUCING PLASTIC NETS AND THE LIKE
Filed Feb. 1, 1957
8 Sheets-Sheet 1
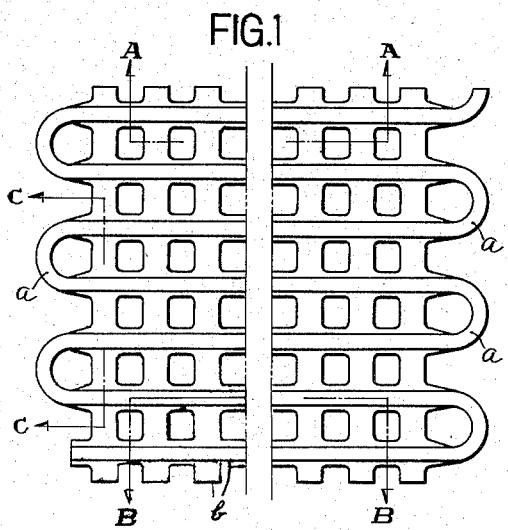
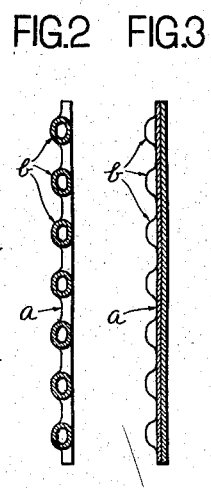
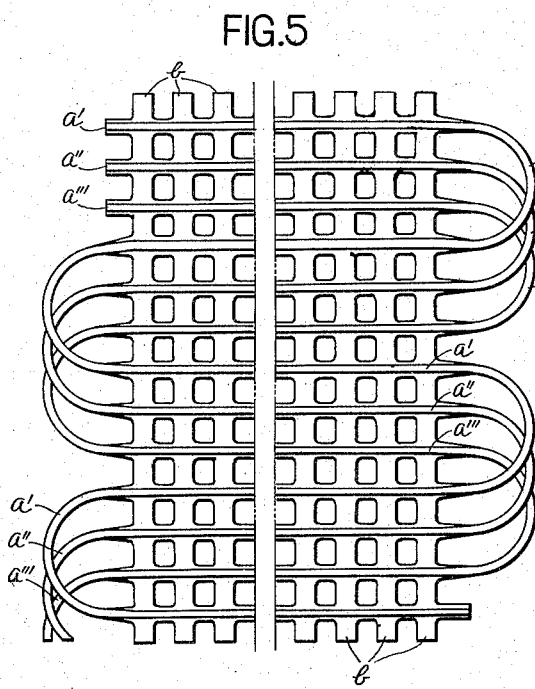
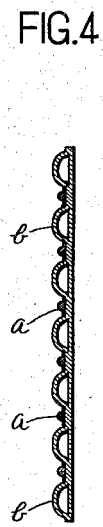
INVENTOR
IWAO ONO,
BY *Hall & Houghton*
ATTORNEY July 21, 1959

IWAO ONO 2,895,535

PROCESSES AND APPARATUSES FOR PRODUCING
PLASTIC NETS AND THE LIKE

Filed Feb. 1, 1957

INVENTOR

IWAO ONO,

BY Hall & Houghton

ATTORNEY

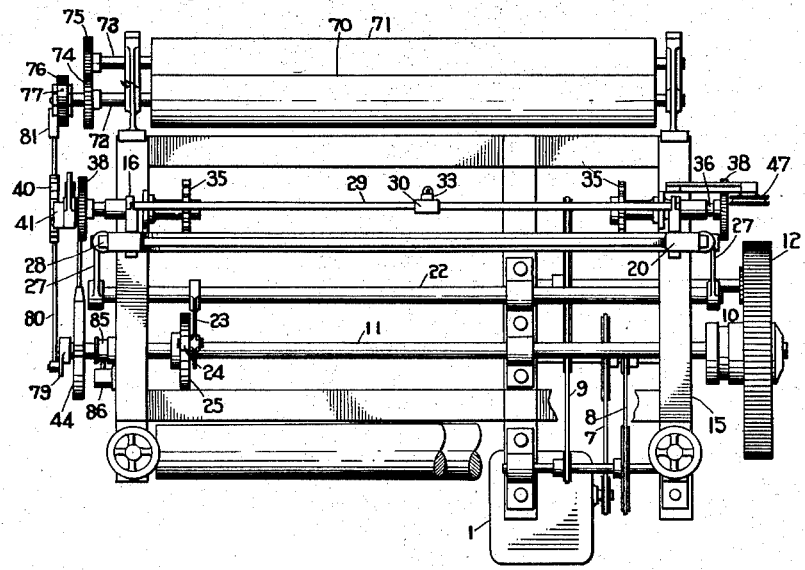

July 21, 1959

IWAO ONO 2,895,535

PROCESSES AND APPARATUSES FOR PRODUCING
PLASTIC NETS AND THE LIKE

Filed Feb. 1, 1957

INVENTOR
IWAO ONO,
BY Hall + Houghton
ATTORNEY

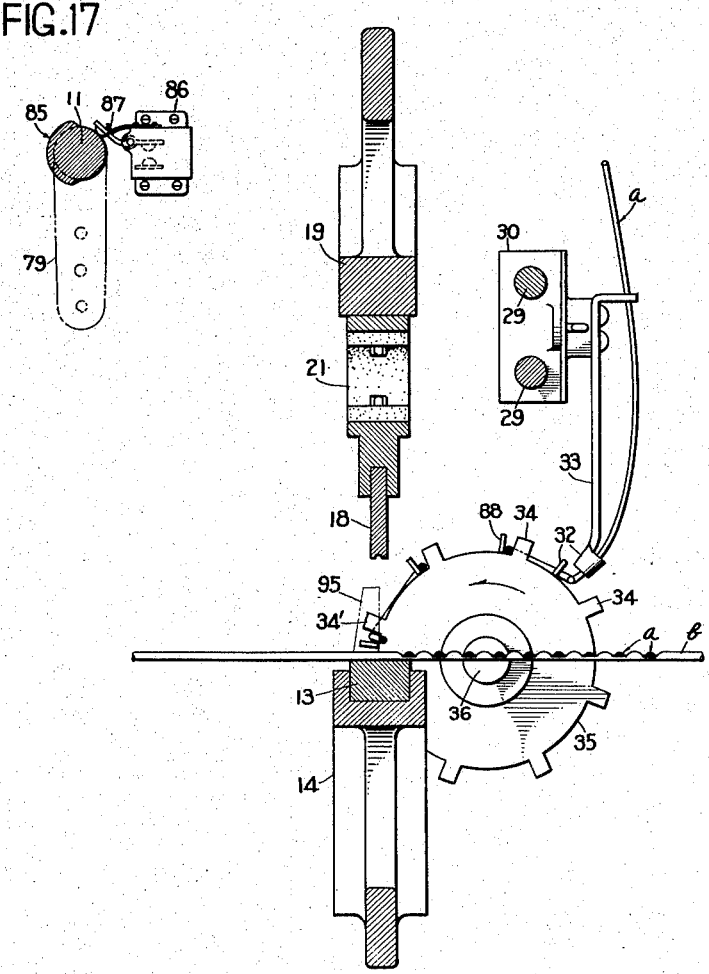

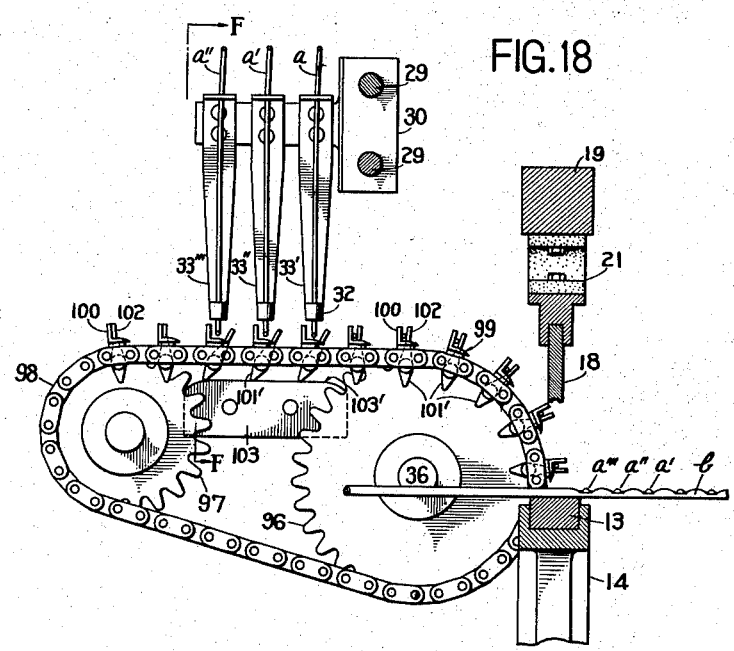
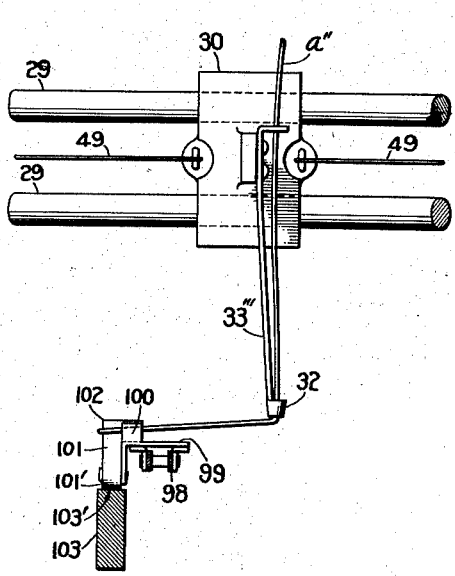

United States Patent Office 2,895,535
Patented July 21, 1959

2,895,535

PROCESSES AND APPARATUSES FOR PRODUCING PLASTIC NETS AND THE LIKE

Iwao Ono, Fuse City, Japan

Application February 1, 1957, Serial No. 637,792

6 Claims. (Cl. 154—1.7)

This invention relates to improvements in processes for producing plastic nets or the like and apparatuses therefor, and particularly to welding machines for producing novel and useful articles invented by me and entitled "Plastic Modified Nets" for which a Letters Patent was applied by me, the specification of said copending application, Serial No. 458,096 filed September 20, 1954 now Patent No. 2,772,193 disclosing the characteristics of said articles.

This article is made of a thermoplastic substance, such as vinyl chloride resin. Said article is composed of a warp or warps and a plurality of woofs. Said woof may be a plurality of lines of cords, strings, threads, tubes, or straps. Said warp may be a similar material to the woof or furthermore a single film or a sheet. The structure of this article is made neither by a weaving nor a knitting process, but is obtained by laying the rows of the woof over and across the row or rows of the warp and welding them as they are. The terms warp and woof as used herein, by analogy to the terms used in the art of weaving, designate, respectively, the initially arranged longitudinal element or elements, and the subsequently applied elements that extend transversely thereof.

Although there was disclosed only a mono-chromatic woof in said specification of said copending application, Serial No. 458,096, it has been invented by me that a series of differently colored woofs may be used to make said articles so as to obtain striped or even checked articles. Said articles may be made manually, but no automatic means has been known prior to this invention in order to produce such a product.

One object of this invention is to provide an automatic means of producing such articles as above.

Another object of this invention is to provide a means of producing said articles on a large scale.

Still another object of this invention is to provide a means whereby fine, snug, and uniform structures of said articles may be achieved.

Further another object of this invention is to provide a means whereby fine, fresh, and smart articles with many variations may be produced which is suitable to use as mats, mounts, screens, curtains, etc.

Other objects will be in part obvious or in part pointed out hereinafter. The invention accordingly consists in the features of construction, combinations of elements and arrangements of parts, as will be exemplified in the structure and construction to be hereinafter described and the scope of the application of which will be indicated in the following claims.

In the accompanying drawings, illustrating two of many possible embodiments of the mechanical features of this invention:

Figure 1 is a plan view of a product produced by an embodiment of this invention;

Figures 2, 3, and 4 are cross-sectional views taken on the lines A—A, B—B, and C—C of Figure 1, respectively;

Figure 5 is a plan view of a product produced by another embodiment of this invention;

Figure 6:
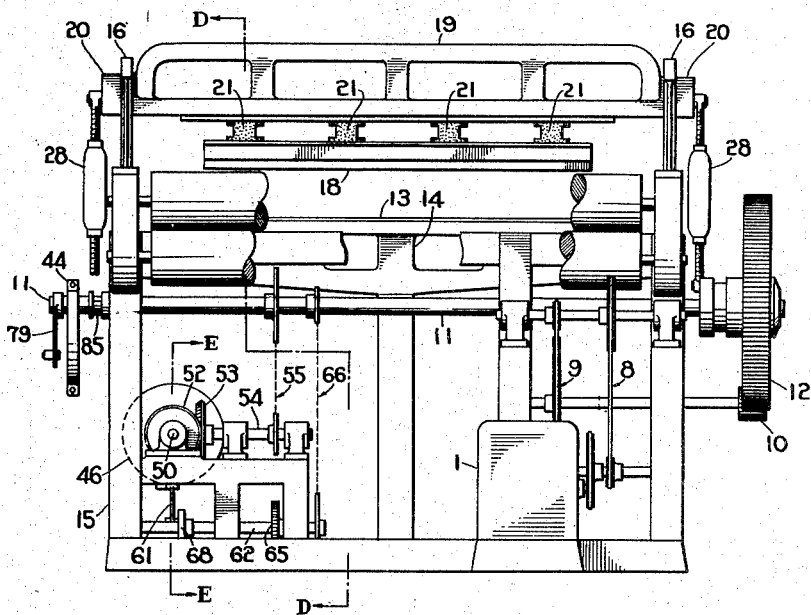
Figure 6 is a rear view of the partly removed first-named embodiment of this invention.
Figure 11:
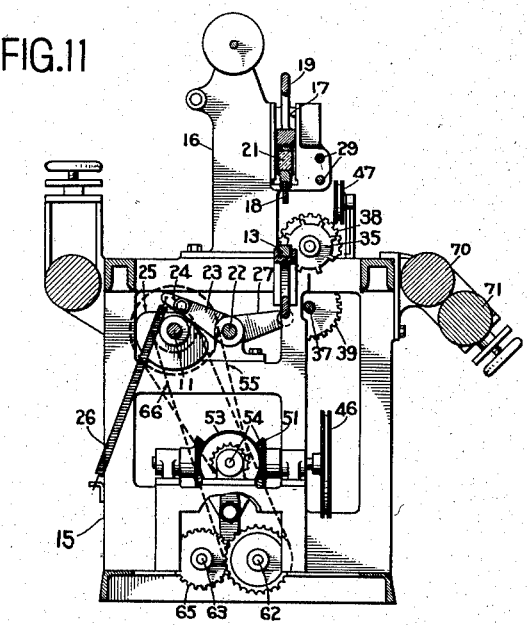
Figure 12:
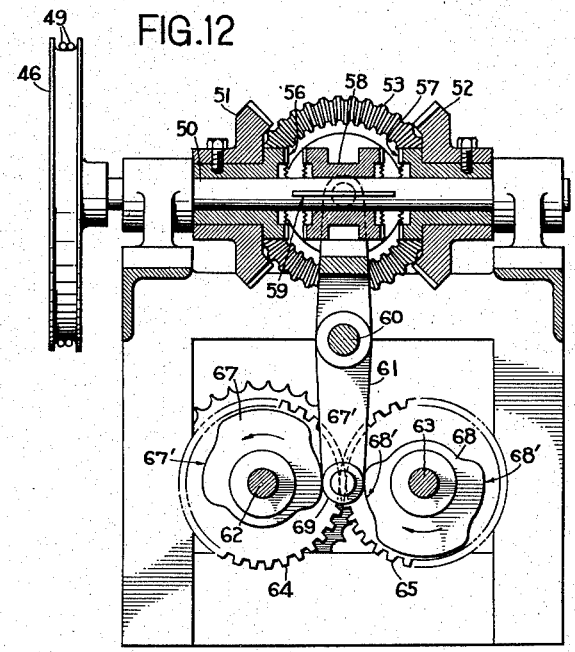
Figure 16:
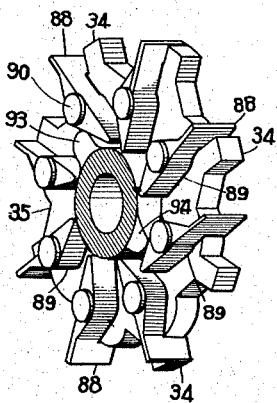
Figure 15:
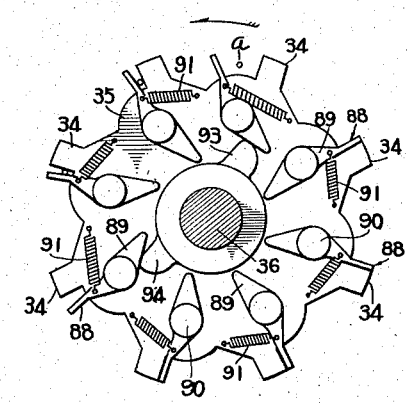
Figure 14:
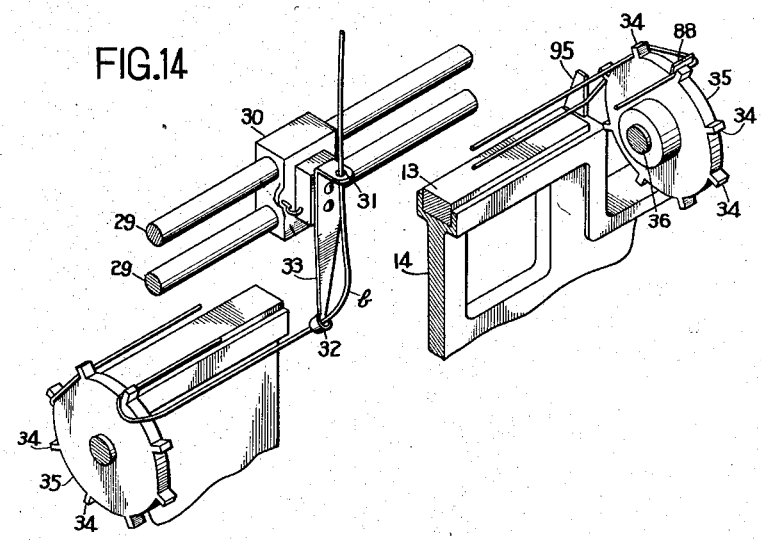
Figure 20:
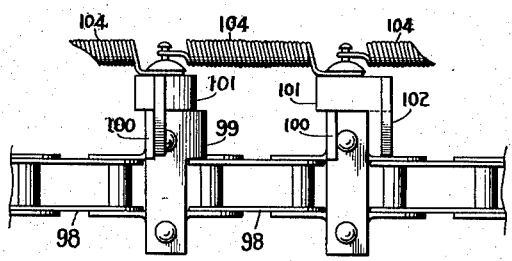
Figure 21:
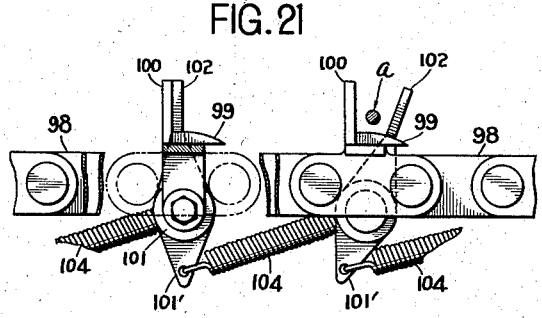

Figures 7, 8, 9, and 10 are front, top, left side, and right side views of the machine shown in Figure 6, respectively;

Figure 11 is a sectional elevation of the machine with a woof and a traveller therefor removed, shown in Figure 6 taken on the line D—D thereof;

Figure 12 is a partly sectional elevation of a reversing mechanism on an enlarged scale taken on the line E—E of Figure 6;

Figure 13 is a sectional elevation of a welding mechanism and a woof-laying mechanism similar to a part of Figure 11 but on an enlarged scale;

Figure 14 is a partly removed perspective view corresponding to Figure 13;

Figure 15 is an elevation in detail of a hooked disk shown in Figure 14 with parts removed;

Figure 16 is a perspective view of the hooked disk shown in Figure 15 with springs removed;

Figure 17 shows a switch;

Figure 18 is a sectional elevation of a welding mechanism and a woof-laying mechanism of the second-named embodiment of this invention, corresponding to Figure 13;

Figure 19 is a rear view on an enlarged scale of a traveller shown in Figure 18; and Figures 20 and 21 are top and side views on an enlarged scale of a part of an endless chain shown in Figure 18.

Similar numerals refer to similar parts throughout the several views.

Referring to Figs. 6 to 12, there is a frame structure. A main shaft 11 is extended laterally beyond end members of the frame and journaled rotatably thereby. A gear wheel 12 is fixed on the left end portion of said main shaft 11. Meshing with said gear wheel 12 a small gear 10 is fixed on another shaft which is driven by a motor combined with variable reduction gears thereof 1 through a reduction train of pulleys and belts, said motor combined with the variable reduction gears thereof being fixed aside said frame on a base, and said train comprising pulleys 2, 3, 4, 5, and 6 and belts 7, 8, and 9 as shown in Fig. 9.

Figure 10:
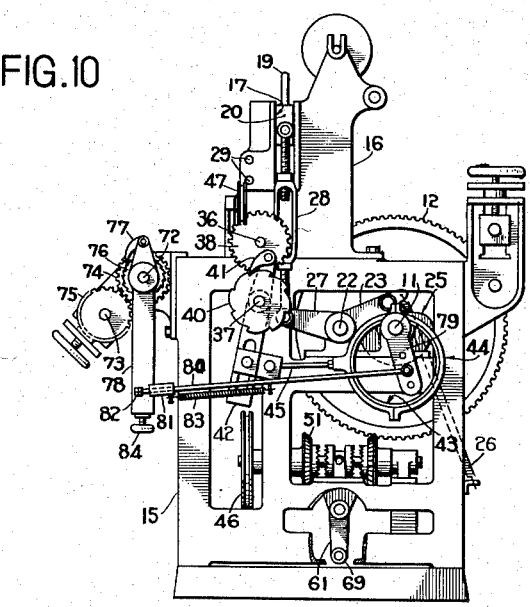

In parallel with the main shaft 11 there is a secondary shaft 22 on which an arm 23 is fixed. Fixed on the main shaft 11 there is a sector cam 25 so as to engage with the arm 23 as shown in Figs. 8, 10, and 11. A roller 24 rotatably mounted on said arm 23 is adapted to travel along the edge of said sector cam 25 by the action of a bracing spring 26 anchored on the end of the arm 23 and on a portion of the frame so that the secondary shaft 22 oscillates according to the rotation of the main shaft 11. End arms 27 are fixed on ends of the secondary shaft 22 and linked with lifting members 28 which are adjustable in length by screws, respectively.

On each of the lateral side members of the frame a supporting stand 16 is provided, on which a vertical guide passage 17 is formed so as to guide a sliding member 20 vertically. At the uppermost end of said lifting member 28 it is linked with said sliding member 20 (see Fig. 10). The sliding members 20 of both sides are fixed on ends of a yoke 19 which extends through the guide passage 17 so that the yoke 19 is adapted to be lifted and lowered once in a rotation of the main shaft 11. As shown in Figs. 6 and 11, and particularly enlarged in Fig. 13, below the yoke 19 there is an upper electrical terminal 18 which is suspended and electrically insulated from and fixed on the yoke 19 by means of a plurality of insulators 21. Against the upper electrical terminal 18 a lower electrical terminal 13 insulated suitably is fixed on the top member 14 of the frame. These terminals 13 and 18 are made of a metal rod such as brass and extended depending upon the width of the product.

Referring to Figs. 6, 8, and 11, supported by the rear end portion of the frame there is a pair of brackets between which a pair of feed rolls is mounted rotatably. The warp b is fed from a suitable source through the adjustable nip between the feed rolls which are not driven positively.

Referring to Figs. 7, 8, 9, and 11, supported by the front end portion of the frame there is a pair of brackets between which a pair of take-up rolls 70 and 71 is mounted rotatably. Each shaft 72 and 73 of the take-up rolls 70 and 71 is extended rightwards in Fig. 7 (but leftwards in Fig. 8) beyond the bracket, respectively. On said extended portion of the shaft 72 a gear 74 is fixed which meshes with a gear 75 of the same size with the above and fixed on the shaft 73. A ratchet wheel 76 is fixed on the right end of the shaft 72 and driven by a pawl 77 mounted oscillatably on the upper end of a lever 78 which is mounted also oscillatably on the rightmost end of the shaft 72. On a lower part of the lever 78 a supporting sleeve 81 is mounted oscillatably. One end of a connecting rod 80 is extended slidably through the sleeve 81 while the other end of the rod is linked oscillatably with an arm 79 which is secured on the main shaft 11. A check nut 82 is fixed on the front end of the connecting rod 80 while an intermediate portion thereof is pulled by a bracing spring 83 towards the supporting sleeve 81, as shown in Figs. 8 and 10. By virtue of the above mechanism the take-up rolls 70 and 71 are driven positively and intermittently once in one rotation of the main shaft 11.

Supported by the supporting stands 16 at both ends two rails 29 are arranged before and in parallel with the upper terminal 18 as shown in Figs. 7, 8, 9, 10 11, and 13. A traveller 30 is mounted on the rails 29 so as to be capable of sliding along the rails transversely. A guide eye 31 and a guide hole 32 are provided in a frontward protrusion and a downward protrusion formed in a guide member 33 of the traveller 30, respectively.

Figure 7:
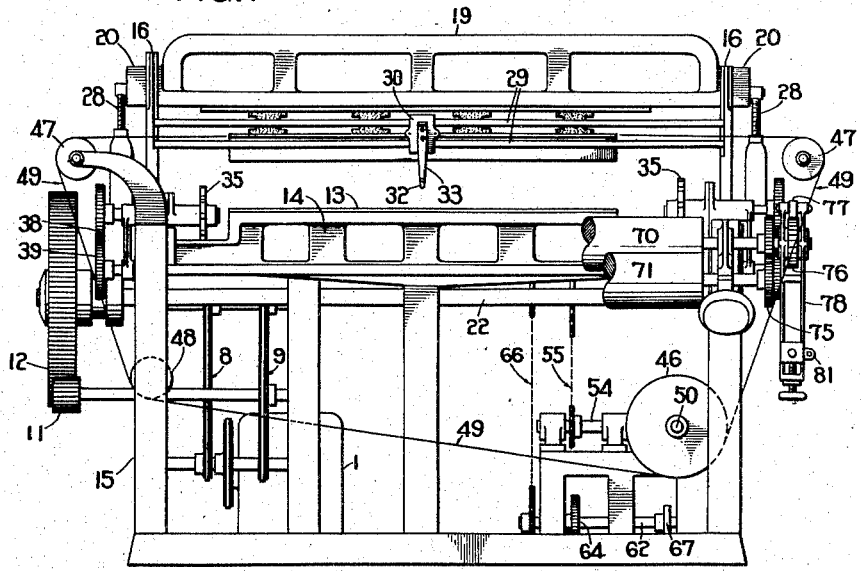

A pair of gears 64 and 65 of the same size with each other is fixed on a pair of shafts 62 and 63 so as to mesh with each other and one of which is driven by the main shaft 11 by means of a chain 66, as shown in Figs. 11 and 12. A pair of cams 67 and 68 are of the same size with each other having half-ballooned edges 67' and 68' and are secured on the shafts 62 and 63, respectively, in such a manner that there is a phase difference of approximately 180° therebetween. A shaft 60 is journaled on the frame. A change lever 61 is mounted on the shaft 60 oscillatably. A roller 69 is mounted rotatably in the lower end of the change lever 61 and adapted to be inserted snugly between the two cams 67 and 68. Journaled on the frame there is another shaft 54 which is also driven by the main shaft 11 by means of a chain 55, as shown in Figs. 6, 7, and 11. At the right end of the shaft 54 a driving bevel gear 53 is secured thereon which is adapted to mesh with two bevel gears 51 and 52 at all times. The two bevel gears 51 and 52 are fixed on two sleeve members having clutch plates 56 and 57 at their inner ends face to face with each other, respectively. A reversing shaft 50 is also mounted on the frame rotatably on the same level with the shaft 54, whereon said two sleeves are mounted rotatably. A transferable clutching member 58 is mounted on the reversing shaft 50 at the central portion thereof in such a manner as to be slidable axially but not rotatable thereon by means of a key 59 fixed thereon. Said transferable clutching member 58 comprises two clutch plates to be adapted to engage with said clutch plates 56 and 57 of the two sleeve members alternatively and a circumferentially annular groove which is adapted to engage with the upper end of the change lever 61. A yoke is formed at the upper end of the change lever 61 and is inserted freely into the annular groove of the transferable clutching member 58 so as to transfer the transferable clutching member 58 axially along the reversing shaft 50. By virtue of this mechanism the transferable clutching member 58 is capable of engaging with the two clutching plates 56 and 57 alternatively and is made to stay in a neutral position according to the swing of the change lever 61, resulting in that the reversing shaft 50 is able to be revolved either in a direction or negatively in accordance with variation in phase of the cams 67 and 68, as shown in Fig. 12. A reversing grooved pulley 46 is fixed on the reversing shaft 50. A belt 49 anchored to the traveller 30 is looped across it and over three idle pulleys 47 and 48 mounted on the frame rotatably and the reversing grooved pulley 46 with care of slipping so that the traveler 30 is made to travel along the rails 29 transversally driven by the reversing grooved pulley 46, the alternate direction of said travel of the traveller 30 depending upon the direction of rotation of the latter, as shown in Fig. 7. The traveller 30 must not only travel transversally from end to end of the rail 29 as above, but also stay at the ends for a predetermined while. In order to attain such a motion as above, the coupled cams 67 and 68 are provided with the half-ballooned edges 67' and 68', respectively, which cooperate to stand the transferable clutching member 58 in the neutral position so as to keep said member 58 in a disengagment state with either of the clutch plates 56 and 57 resulting in keeping still the reversing shaft 50 and the reversing grooved pulley 46 fixed thereon. The necessity of such a motion as above of the traveller 30 will be explained hereinafter.

Inside the arm 79 an eccentric sheave 43 is mounted on the main shaft 11. An eccentric strap 44 for the sheave 43 protrudes a rod 45 integrally which links oscillatably with a lever 42, as shown in Fig. 10. The lever 42 is mounted oscillatably on an end of a shaft 37 extended transversally beyond and rotatably journaled by the frame, as shown in Fig. 7. A ratchet wheel 40 fixed on the shaft 37 is driven by a pawl 41 mounted oscillatably on the lever 42. On each side of the frame a gear 39 is fixed on the shaft 37 in mesh with a gear 38 fixed on a shaft 36. The shafts 36 are not integral with each other but are arranged in alignment with each other by means of sleeve bearings 92 fixed on the frame. Hooked disks 35 are fixed on the inner ends of the shafts 36. The hooked disk 35 comprises a plurality of hooks 34 protruding radially around the periphery thereof with an angularly equal space between a hook and the adjacent one, as shown in Fig. 13. The hooked disk 35 is arranged in such a manner that the hook 34 travels around the shaft 36 across the locus of the guide hole 32 of the traveller 30, said locus extending transversally along the rails 29 from end to end thereof inside the frame. At the same time the hook 34 passes through a position which is the horizontal outward extension of a position down to which the upper electrical terminal 18 is lowered.

Now referring to Figs. 15 and 16 showing more particularly the hooked disk 35 in detail, each hook 34 is provided with a clamping member 89. The clamping member 89 is mounted oscillatably on one side of the hooked disk 35 by means of a pin 90 and provided with an one-sidedly extended clamping head 88 which is biassed towards the hook by means of a bracing spring 91. Meantime, the sleeve bearing 92 fixed on the frame has two radial protrusions 93 aside the hooked disk 35. Assuming that the hooked disk 35 revolves in the counterclockwise direction as shown in Fig. 15, around the sleeve 92 one of the two protrusions 93 is positioned at somewhat right-handed side of the highest position and the other is positioned at somewhat left-hand side of the lowest position so that the inner end of the clamping member 89 is adapted to engage with the first-named protrusion 93 to open a space therebetween and the hook 34 against the action of the bracing spring 91 before said hook arrives at the highest position for it, in order to provide a passage across the locus of the hook to allow the lower end of the guide hole 32 of the traveller 30 to traverse the locus, that follows to keep clamping a line of the woof a between the hook 35 and the clamping head 88 of the clamping member 89 by virtue of the action of the bracing spring 91 until the hook 34 arrives at a position before its lowest position, where the other protrusion 93 of the sleeve bearing 92 tilts the clamping member 89 to reopen the space between the hook 35 and the clamping head 88 resulting in to release the line of the woof a. During the line of the woof a being kept hold of between the hook 35 and the clamping head 88, the hook 35 with the line of the woof a passes through the highest position and then the leftmost position for the hook 35 where the upper electrical terminal 18 operates upon the line of the woof a, as shown in Figs. 13 and 15. The numeral 95 in Fig. 13 indicates a guide for setting the line of the woof a in a proper location when the upper electrical terminal 18 acts.

The main shaft 11 comprises a cam 85 as shown in Figs. 8 and 17. The cam 85 is a semi-circular rib provided around the main shaft, which tilts a follower 87 so as to close an electrical circuit at a switch 86. The circuit comprises the upper electrical terminal 18, the lower electrical terminal 13, the switch 86, and an appripriate source of a high frequency. During when the follower 87 is kept on the cam 85, the circuit is energized so as to pass the high frequency through the line of the woof a and a portion of the warp b where the woof crosses over the warp to weld the former on the latter.

In operation, the warp b is arranged appropriately so as to be fed through the nip between the pair of feed rolls. The warp b may be a film, a sheet, or a plurality of straps, threads, or tubes arranged in parallel. The starting end of the warp b is passed under the upper electrical terminal 18 and the traveller 30 and over a take-up roll 70 and then into the nip between the pair of take-up rolls 70 and 71 which will draw the warp when the electrical system is energized.

The woof a may be a line of cords, strings, threads, or tubes and may be provided as a coil located for instance above the machine. The starting end of the woof a is passed through the guide eye 31 and then the guide hole 32 of the traveller 30 downwards as shown in Fig. 13. Then the end of the woof a is fastened temporarily and the electrical system is energized. When the motor is energized, the entire mechanism is driven thereby automatically. One cycle of the operation of this machine comprises four periods.

In general, during the 1st period, the connecting rod 80 is pulled towards the main shaft 11, the ratchet 76 is driven by the pawl 77, the product is pulled by the take-up rolls 70 and 71, the roller 24 is not being pushed by the cam 25, the arm 27 is not in its lowest position, the follower 87 is not being pushed by the cam 85, the switch 86 is kept off, the upper electrical terminal 18 is not in its lowest or operating position, the roller 69 is in the neutral position between two half-ballooned edges 67' and 68', the transferable clutching member 58 is kept in the neutral position in engagement with neither clutch plates 56 nor 57, the traveller 30 stays at its outermost position, the lever 42 is pulled by the eccentric 43 and 44, the ratchet wheel 40 is driven by the pawl 41, the gear 38 and the hooked disk 35 is driven in the counter-clockwise direction in Fig. 10 by an angle corresponding to the substitution of a hook for the preceding one (relatively speaking, the woof a is made to extend from a hook to the next hook) outside either one of the two hooked disks 35, none of the clamping members 89 is made to tilt completely while some of them are clamping the woof a there between and the hooks 34.

During the 2nd period, the connecting rod 80 is pushed towards the lever 78, the ratchet wheel 76 is kept still, the product is not pulled by the take-up rolls 70 and 71, the roller 24 is kept in pushed state by the cam 25 against the action of the spring 26, the arm is kept in its lowest position, the follower 87 is kept in its raised position by the cam 85, the switch 86 is kept on, the upper electrical terminal 18 is in its lowest position and is energized, the roller 69 is not in the neutral position but is, for example, in its left position, the transferable clutching member 58 is kept in its right position in engagement with the clutch plate 57 so as to revolve the reversing grooved pulley 46 in the same direction with the bevel gear 52, for example, in the clockwise direction, the traveller 30 is transferred, for example, from the left side to the right side extending the woof a from a hook 34 of the left hooked disk 35 to a corresponding hook of the right hooked disk, the lever 42 is pushed by the eccentric 43 and 44, the ratchet wheel 40 is not driven by the pawl 41, the gear 38 and the hooked disk 35 is kept still, the clamping member is kept tilting by engagement with the radial protrusion 93 so as to provide a passage for the travel of the traveller 30.

The 3rd period is similar to the 1st period in mode of motion, but the traveller 30 stays at its outermost position which is the opposite one to that of the 1st period, a third hook is substituted for the next hook, the woof a is made to extend from the "next" hook to the third hook outside the hooked disk referred to in the 1st period.

The 4th period is similar to the 2nd period in mode of motion, but the roller 69 is in its right position, the transferable clutching member 58 is kept in its left position in engagement with the clutch plate 56 so as to revolve the reversing grooved pulley 46 in the counter-clockwise direction in Fig. 7, the traveller 30 is transferred from the right side to the left side.

Thus a cycle is finished. The product has a leftward woof and a rightward woof alternately, the former being integral with the latter connected by a selvage bent at a straight angle. At the same time the hook 34 has proceeded by twice as much as an angle placed between a hook 34 and the next one. Then the 1st period comes again.

In order to adjust the heat generated by the high frequency, it is preferable to provide a variable condenser. By means of adjusting the capacity of the condenser, the frequency is varied so as to select a proper temperature depending upon the characteristics of the material, the area to be welded, and the speed of the machine. Meantime, in view of statics, the time and the pressure required for an individual welding operation may be adjusted mechanically. According to this invention the entire mechanism is driven by the main shaft 11. Therefore, any portion of the operation cycle may be kept in a predetermined relation. In order to vary a factor in the production, a portion of the mechanism may be substituted. For example, only a cam may be substituted for of another shape.

According to the embodiment of this invention, not only the mono-chromatic product but also the vertically striped products may be made, if differently colored warps b are arranged. It is however, impossible to produce the transversally striped product. Now by means of the following embodiment of this invention, not only the transversally striped product but also the check may be produced. Now the second embodiment of this invention will be explained referring to Figs. 5, 18 to 21.

The product of this embodiment comprises three kinds of the woofs, particularly three lines of the woofs of different colors a', a'', and a'''. In general, the machine of this embodiment is similar to that set forth hereinbefore except the following phases.

While the rails 29 for the traveller 30 are located in front of (in Fig. 13, at right hand of) the yoke 19, the corresponding rails 29 of this embodiment are located behind (in Fig. 18, at left hand of) the yoke 19. Along the rails 29 a traveller 30 is made to travel similarly, but is carries three guide members 33', 33" and 33'" which are substituted for a single guide member 33. The three guide members are arranged at right angle to the rail 29 and include guide eyes and guide holes 32, respectively.

Under the extreme positions for these guide holes 32, two hooked endless chains 98 are arranged for substituting for the hooked disks 35. The chains 98 are driven by two pairs of sprocket wheels, one pair 96 being a larger size fixed on the shaft 36 provided in each side as the hooked disk 35 in the preceding embodiment, while the other pair 97 is of smaller size fixed suitably for the mere purpose of idly supporting the chain 98. A unitary element of the hooked endless chain 98 comprises four parts, that is, a hooked element 99, a clamping element 101, a spring 104 and a jointing element. The hooked element 99 and the jointing element are formed somewhat conventionally except a hook 100 extended outwardly with respect to the oval path of the chain and a bottom extended frontwards with respect to said path from the hooked element 99, respectively. The clamping element 101 is mounted tiltably about a horizontal pin carried by the hooked element 99 and has a clamping head 102 to be arranged against the hook 100. The clamping element 101 further comprises an opposite extension 101' which is pulled by the coil spring 104 anchored on the pin of the hooked element 99 of the preceding unitary element so as to close the space between the hook 100 and the clamping head 102 of the clamping element 101. In order to open the space between the hook 100 and the clamping head 102 during a period required for clamping the woofs a', a", and a'", a stationary flat-topped upholder 103 corresponding to the radial protrusion 93 of the preceding embodiment is provided below the loci of the guide members 33', 33", and 33'" and within the oval plane defined by the chain 98 so as to make the opposite extension 101' encounter the flat top 103' when a clamping element 101 passes across the loci of the guide holes 32. During the engagement of the opposite extension 101' with the flat-topped upholder 103, the former is made to tilt against the action of the spring 104 so as to open the space between the hook 100 and the clamping head 102. It will be understood that since the three members 33', 33", and 33'" of a set of guide members are operated simultaneously, the three lines of the woofs a', a", and a'" are positioned on the chain simultaneously. At that time, it is necessary that the clamping head 102 has been tilted to open the space therebetween and the hook 100 by means of the flat top 103' of the flat-topped upholder 103. While locating the lines of the woofs on the chains is made three by three, the progress thereof is made one by one in order to weld the woof one line at a time with the warp b by a similar means to the preceding embodiment.

It will be unnecessary in view of the description in connection with the preceding embodiment to illustrate the detailed construction and operation for this embodiment. However, the machine of this embodiment is capable of producing even a checked product. In Fig. 5, an enlarged structure or texture of a traversely striped product is shown. The warp b was arranged in parallel through the nip between the feed rolls and then fed between the upper and the lower electrical terminals 18 and 13 rightwards in Fig. 18. The woofs a', a", and a'" are of a different color each.

While the machine of the preceding embodiment acts with a cycle comprising four periods, the machine of this embodiment acts with a cycle of twelve periods. During the 1st period, the three lines of the woofs a', a", and a'" are fed through three guide eyes and then three guide holes 32 of the three guide members 33', 33", and 33'" of the traveller 30, respectively. A set of three differently colored lines of the woofs a', a", and a'" is set within a series of spaces between hooks 100 and clamping heads 102 of a chain 98 arranged in one side, extended transversally therefrom to a corresponding series of spaces between hooks and clamping heads of the other chain arranged in the other side, and then laid in the second-named spaces, respectively simultaneously during the chains rested together with the shaft 36. Thus the three lines of different colors are laid in parallel.

On the other hand, only one of the preceding lines extended between the chains 98 has just arrived at the rightmost position on the chains 98 in Fig. 18, where it is welded onto the warps b just kept there between their two rightward displacements, by means of high frequency energized between the terminals 18 and 13, the former being just at its lowermost position at that moment.

During the 2nd period, the upper terminal 18 is not in the energizing position, the chain 98 is displaced in the clockwise direction in Fig. 18 by a unitary element thereof in length while the woof-laying mechanism is kept still, the three lines a', a", and a'" of the woofs extending leftwards in Fig. 18, relatively to the guide members 33', 33", and 33'" outside the chain 98.

During the 3rd period, another line of woofs is welded.

The 4th and the 5th periods are similar to the 2nd and 3rd periods, respectively. Therefore, during from the 2nd to 5th periods, inclusive, the three lines of the woofs a', a", and a'" extend by means of the guide holes 32 kept their extreme positions, looping semi-circular paths outside the chain and enter every fourth space between the hooks 100 and the clamping heads 102, displaced rightwards three times intermittently, respectively.

The periods following thereafter corresponded substantially to the first six periods except the direction of the extension of the woofs opposite to that during the latter periods.

Now the second embodiment of this invention has been modified further to satisfy a requirement for speeding up the productivity of this machine. The modified machine comprises a plurality of, for example three, sets of welding terminals to be energized simultaneously. In this connection, the set of woofs of corresponding number is fed, transferred, laid, and taken up simultaneously. The cycle of operation comprises four periods as the first-named embodiment.

During the 1st period, the three lines of the woofs are fed and extended transversally simultaneously. Meantime other three lines of the precedently extended lines of the woofs are welded onto the warps simultaneously by virtue of the three sets of welding terminals. During the 2nd period, the three upper terminals are not in the energizing position and the three lines extend outside the chain simultaneously. The 3rd period is similar to the 1st period other than the direction of the extension. The 4th period is similar to the 2nd period other than the location of the extension. In other words, a plurality of lines of the woofs is substituted for a single line in the first embodiment as a set by virtue of the plurality of terminals constructed so as to be operated simultaneously.

Although no drawings are shown in connection with this embodiment, a conventional mechanism additionally built in the machine set forth hereinbefore may satisfy the requirement to operate as above. It is preferred to modify the manner of releasing the set of lines of the woofs from the clamping members. The endless chain is made to progress along a straight extension of the course thereof over a second flat-topped upholder where the three sets of electrical terminals are energized simultaneously and the selvages of the three lines of the woofs are released from the clamping members.

I claim:

1. A method of continuously producing a thermoplastic article having a warp of thermoplastic material together with which is bonded a plurality of thermoplastic woof lines arranged transversely of said warp, which comprises intermittently advancing the warp longitudinally through a high-frequency welding means, drawing each woof line across said warp and laying the woof line on said warp while the latter is stationary in the welding means, then energizing the welding means to press the woof line against and heat-weld the same to the warp along the length of the woof line while the warp is stationary, and then de-energizing the welding means, these steps being continuously cycled, so that the completed article is intermittently discharged from the welding means.

2. A method according to claim 1, wherein the said warp consists of a plurality of thermoplastic warp lines.

3. A method according to claim 1, wherein the said warp consists of a thermoplastic sheet.

4. A machine for continuously producing a thermoplastic article including a warp of thermoplastic material together with which is bonded a plurality of thermoplastic woof lines arranged transversely of said warp, which comprises, in combination, a welding means having a pair of cooperating upper and lower pressure electrodes, one of the said electrodes being movable upwardly and downwardly with respect to the other, said electrodes normally being spaced from each other, means for intermittently feeding the warp in the direction of the length thereof through the space between the electrodes, means for intermittently feeding a woof line across said warp and for laying the woof line on the warp while the latter is interposed between said electrodes, means for periodically moving the movable electrode while the warp and the woof line thereon are stationary in said space to presshold both the warp and the woof line between said electrodes for a predetermined period of time and thereafter to move said movable electrode oppositely to release the line, means for periodically energizing the electrodes for said predetermined period of time to produce a high frequency field in the electrode zone thereby to heat-weld the said lines together along the length of the woof.

5. A machine according to claim 4, wherein said woof line feeding means comprises a pair of hooking means located at both sides of a path of the warp adjacent the lower electrode and adapted to be intermittently driven from a shaft located across said path, each of said hooking means having a plurality of equally spaced hooks projected outwardly from the periphery thereof, a traveller carrying a woof line guide member, means actuated each time that the hooking means are stationary to cause said traveller to reciprocatively travel over said path parallel to said shaft and laterally beyond the positions of said hooking means so that the woof line carried by said guide member engages with one hook on one of the hooking means and further with the corresponding hook on the other hooking means to extend therebetween, means for driving said hooking means intermittently a distance equal to one space between adjacent hooks whereby, at one stationary state of the hooking means the woof line hooked by a hook on one of the hooking means is extended therefrom to the corresponding hook on the other hooking means when the guide member travels in one direction, and in the next stationary state of the hooking means the next line of the woof is hooked by the hook next to the last-mentioned hook and is extended therefrom to the corresponding next hook on the opposite hooking means by the travel of the guide member in the opposite direction, the woof lines being laid on and across said warp between the electrodes one by one at each movement of the hooking means.

6. A machine according to claim 4, wherein said woof feeding means comprises a pair of hooking means located at both sides of a path of the warp adjacent the lower electrode and adapted to be intermittently driven from a shaft located across said path, each of said hooking means having a plurality of equally spaced hooks projected outwardly therefrom, a traveller carrying a plurality of woof line guide members, means for causing said traveller to reciprocatively travel over said path parallel to said shaft and laterally beyond the positions of said hooking means so that the separate woof lines carried by said guide members respectively engage corresponding hooks on one of said hooking means and corresponding hooks on the other hooking means, to extend therebetween when the traveller travels in one direction, and successive woof lines engage respectively the next corresponding hooks on the other hooking means and then the corresponding hooks on the opposite hooking means when the traveller travels in the opposite direction, means for driving said hooking means a distance equal to one space between adjacent hooks, whereby the woof lines are laid on and across said warp interposed between the electrodes, one by one at each movement of the hooking means.

References Cited in the file of this patent

UNITED STATES PATENTS

| | | |
|---|---|---|
| 2,522,527 | Manning | Sept. 19, 1950 |
| 2,537,323 | Wurzburger | Jan. 9, 1951 |
| 2,539,690 | Boorn | Jan. 30, 1951 |
| 2,620,850 | Janowski | Dec. 9, 1952 |
| 2,640,796 | Langer | June 2, 1953 |
| 2,721,925 | Langer | Oct. 25, 1955 |